May 21, 1957  C. L. GOOGE  2,793,052
AUTOMATIC TRAILER STEERING DEVICE
Filed May 25, 1956  2 Sheets-Sheet 1

INVENTOR.
CLAUDE L. GOOGE
BY
McMorrow, Berman + Davidson
ATTORNEYS

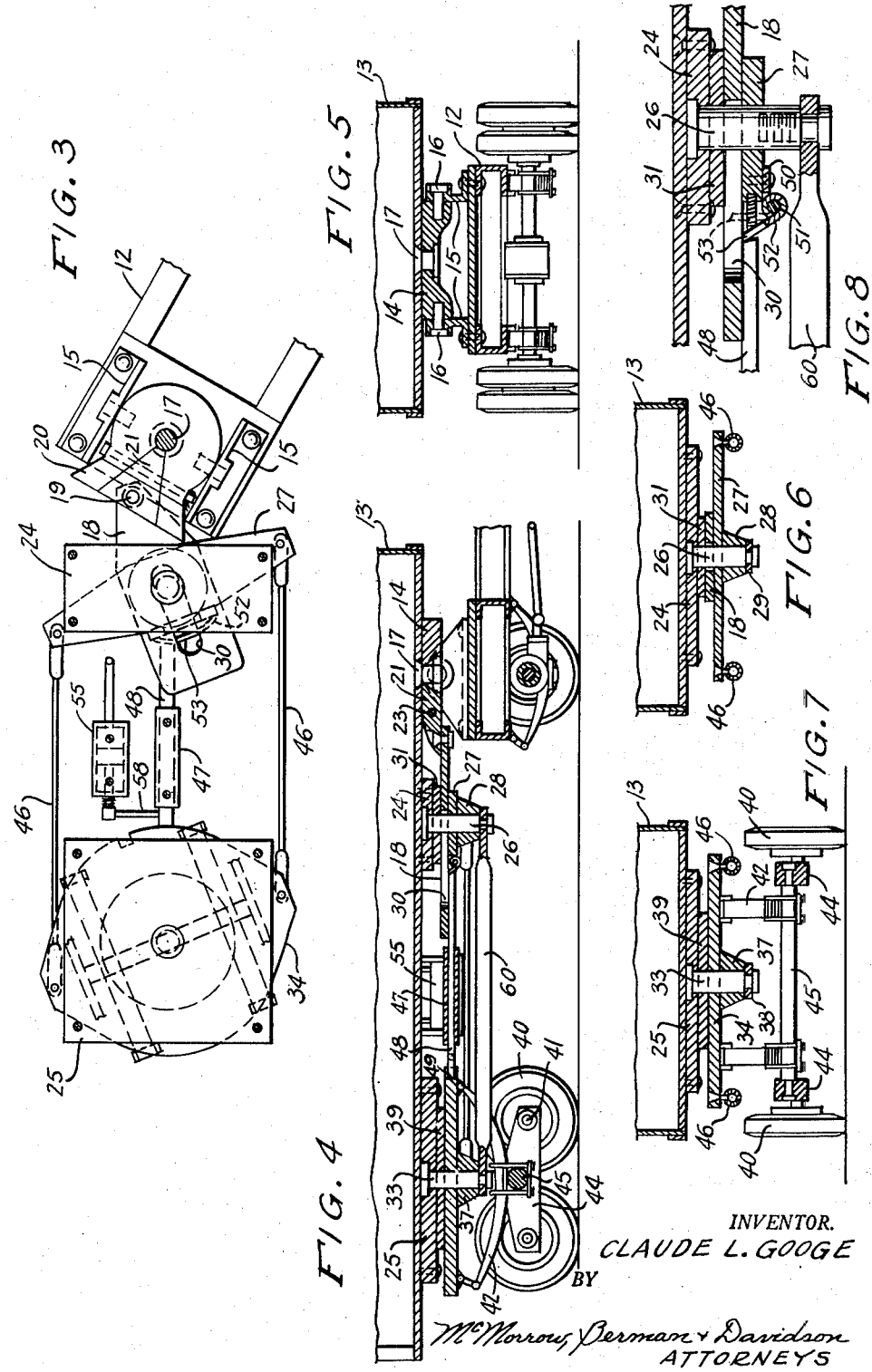

United States Patent Office 2,793,052
Patented May 21, 1957

2,793,052
AUTOMATIC TRAILER STEERING DEVICE

Claude L. Googe, Hazlehurst, Ga., assignor of one-half to Charles H. Rogers, Hazlehurst, Ga.

Application May 25, 1956, Serial No. 587,275

3 Claims. (Cl. 280—426)

This invention relates to trailer vehicles, and more particularly to a steering mechanism for the rear wheels of a trailer in a tractor-trailer vehicle combination.

The main object of the invention is to provide a novel and improved means for steering the rear wheels of a trailer in a tractor-trailer vehicle combination, the improved steering means being simple in construction, being easy to install, and being suitable for use on trailer vehicles of all types, whereby the rear wheels of the trailer may be controlled by the vehicle driver on curves, in backing the trailer vehicle, and under similar situations, as required.

A further object of the invention is to provide an improved steering mechanism for the rear wheels of a trailer, said mechanism being inexpensive to fabricate, being rugged in construction, being reliable in operation, and being easy to place in operation whenever required, being so arranged that it does not interfere with the normal action of the trailer when it is proceeding under normal road conditions.

Further objects and advantages of the invention will become apparent from the following description and claims, and from the accompanying drawings, wherein:

Figure 3 is a horizontal cross sectional view, similar to Figure 2, but showing the steering mechanism in operating condition.

Figure 4 is a vertical longitudinal cross sectional view taken on the line 4—4 of Figure 2.

Figure 5 is a transverse vertical cross sectional view taken on the line 5—5 of Figure 1.

Figure 6 is a transverse vertical cross sectional detail view taken on the line 6—6 of Figure 1.

Figure 7 is a transverse vertical cross sectional view taken on the line 7—7 of Figure 1.

Figure 8 is an enlarged vertical cross sectional view taken on the line 8—8 of Figure 2.

Figure 1:
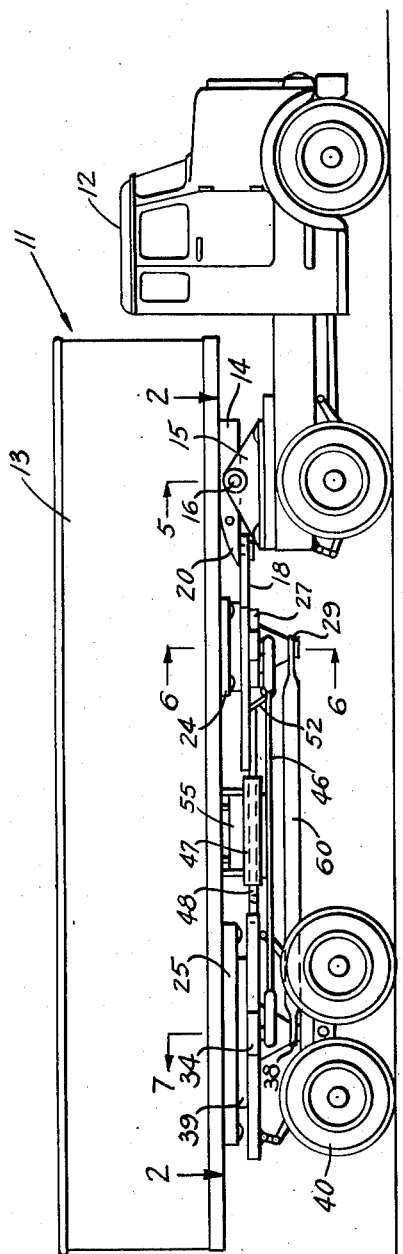
Figure 1 is a side elevational view of a trailer truck provided with an improved steering mechanism for the rear wheels of the trailer portion thereof, constructed in accordance with the present invention.

Referring to the drawings, 11 generally designates a tractor-trailer vehicle, said vehicle comprising the tractor 12 and the trailer 13. The trailer is pivotally connected to the tractor in a conventional manner as by a fifth wheel 14 pivotally mounted on respective side brackets 15, 15 provided on the tractor 12, the fifth wheel 14 being rotatable on a transverse horizontal axis defined by the pivot bolts 16, 16 connecting the fifth wheel 14 to the brackets 15, 15. The trailer 13 is provided at the forward portion of its bottom surface with a pivot stud 17 which is rotatably received in the fifth wheel 14 in the usual manner.

Designated at 18 is a steering link member which is pivotally connected at 19 to a triangular block member 21 which is secured in a V-shaped notch 22 provided in a rearwardly extending extension 20 of the fifth wheel 14 by a transverse fastening bolt 23.

Secured to the bottom of the trailer 13 at a forward portion is a first rectangular anchoring plate 24, and secured to the bottom of the body of trailer 13 at its rear portion is a second rectangular anchoring plate 25. A vertical pivot bolt 26 is secured centrally in the anchoring plate 24, depending therefrom and extending rotatably through the mid portion of a transversely extending steering bar 27, the lower portion of the bolt 26 being provided with a thrust washer 28 which is supported on a flat lug 29 secured to the lower end of the bolt 26, as is clearly shown in Figure 6, said lug 29 comprising one end of a longitudinal tie rod 60.

The steering link member 18 is formed with a longitudinal slot 30 through which the depending pivot bolt 26 extends, the steering link member 18 being positioned between a bearing washer 31 surrounding the bolt 26 subjacent the anchor plate 24, and the transverse steering bar 27, as shown in Figure 6.

Centrally secured to and depending from the rear anchor plate 25 is a vertical pivot bolt 33, similar to the pivot bolt 26, and extending rotatably through the center of a rear, horizontally arranged, plate-like member 34 which is provided with front and rear arcuate edges 35 and 36 having their centers of curvature at the axis of the pivot bolt 33. A thrust washer 37 is provided on the pivot bolt 33 below the member 34, said washer being supported on a flat lug 38 secured to the lower end of bolt 33, similar to the retaining member 29 provided on bolt 26 and comprising the opposite end of rod 60. A washer 39 is provided on pivot bolt 33 between member 34 and the anchoring plate 25.

Respective pairs of road wheels 40, 40 are suitably journaled on axle members 41 which are resiliently connected to the horizontal plate member 34, as by conventional springs 42, defining a conventional rear truck structure. Thus, the truck structure may comprise longitudinally extending side frame members 44, 44 through which the axles 41 extend and which are connected at their mid-portions by a transverse beam member 45 to which the intermediate portions of the leaf spring units 42 are secured.

The opposite ends of the steering bar 27 are connected to the opposite side portions of the truck member 36 by respective longitudinally extending link bars 46, 46, whereby the member 34 rotates simultaneously with the steering member 27.

Rigidly secured to the bottom of the trailer 13 at its intermediate portion is a longitudinally extending sleeve-like bracket 47 in which is slidably mounted a longitudinal locking bar 48. The rear end of the locking bar 48 is at times engageable in a rectangular notch 49 provided in the intermediate portion of the arcuate forward edge 35 of the main truck member 34.

Figure 2:
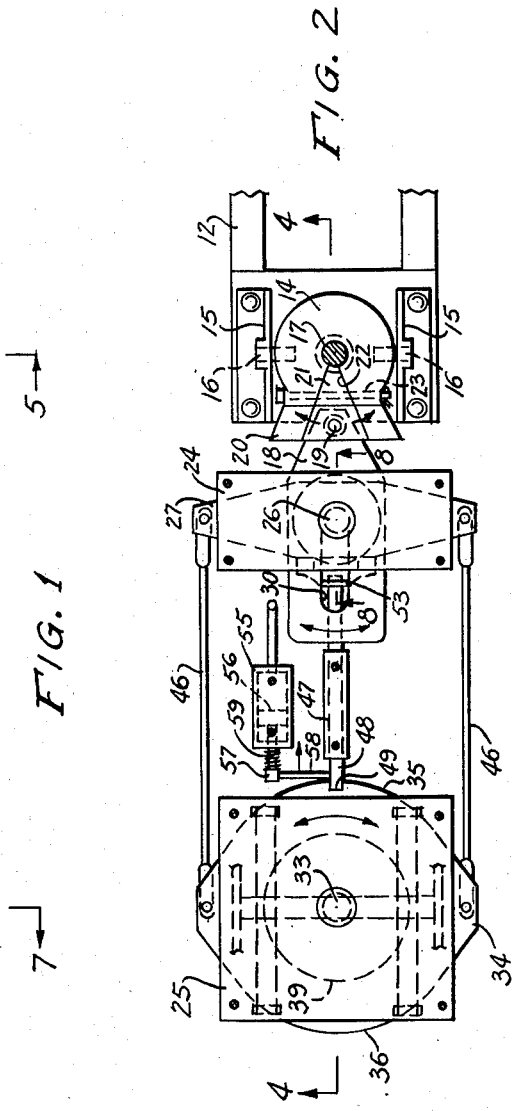
Figure 2 is a horizontal cross sectional view taken substantially on the line 2—2 of Figure 1.

Secured to the underside of the intermediate portion of steering bar 27 adjacent its rear edge is a hinge plate 50, and hingedly connected to the plate 50 as by a transverse hinge pin 51 is a hinge leaf 52 which is formed at the intermediate portion of its free outer edge with a locking lug 53 of a width sufficient to enter and lockingly engage with the longitudinal slot 30 in the steering link member 18. Suitable spring means are provided on the hinge connection around the pin 51 biasing the leaf member 32 downwardly, so that normally the lug 53 is disengaged from the slot 30. The forward end of the longitudinal locking bar 48 is cammingly engageable against the lug 53 and the hinge leaf 52, so that when the locking bar 48 is moved forwardly, the camming engagement of its forward end with the leaf 52 rotates the leaf sufficiently to elevate lug 53 into the slot 30. Thus, when the locking bar 48 is in its rearwardly moved position, shown in Figure 2, the forward end of bar 48 is in a position allowing the leaf 52 to rest in its lowered position, wherein lug 53 is disengaged from slot 30. This uncouples the steering link 18 from the steering bar 27, and at the same time rigidly locks the main truck member 34, so that said main truck member cannot rotate and so that the rear wheels 40 of the trailer cannot be steered.

When the locking bar 48 is moved forwardly to retract the rear end thereof from the notch 49, the main truck member 34 is released, and the lug 53 on the hinge leaf 52 is raised into locking engagement in the slot 30 so that the steering link member 18 is interlocked with the transversely extending steering bar 27. Thus the steering bar 27 rotates with the steering link member 18, and the rotation of the steering bar 27 is transmitted to the main truck member 34 through the link bars 46, 46, causing the main truck member 34 to follow the rotation of the steering bar 27. Thus, with the locking bar 48 in its forwardly moved, notch-disengaging position, the main steering member 34 is released and the rear wheels will be steered by the action of the steering member 18 as it is rotated by the fifth wheel 14 when the tractor 12 is steered. The automatic steering action provided by the steering member 18 on the main truck member 34 greatly shortens the steering radius available for the vehicle, and enables the vehicle to be maneuvered much more easily than if the rear wheels 40 could not be steered.

Secured to the underside of the body of the trailer 13 adjacent and parallel to the sleeve member 47 is a fluid pressure, compressed air or vacuum cylinder 55 containing a piston 56. The piston rod 57 associated with piston 56 extends slidably through the rear end wall of the cylinder 55 and has rigidly secured thereto a transversely extending arm 58. Arm 58 is rigidly connected to the locking bar 48, said arm being perpendicular both to the piston rod 57 and the locking bar 48, whereby the piston 56 moves the locking bar 48 simultaneously therewith. A coiled spring 59 surrounds the piston rod, bearing between the end wall of cylinder 55 and the arm 58, biasing the piston rod 57 rearwardly and thus biasing the locking bar 48 in a rearward direction, whereby it is biased into engagement with the rectangular notch 49.

It will thus be seen that under normal conditions the rear end of the locking bar 48 is lockingly engaged in the notch 49, holding the main truck member 34 in its centered position, whereby the rear wheels 40 of the trailer truck are not steerable. When conditions develop which require increased maneuverability of the trailer truck, such as in restricted locations, or where sharp curves must be negotiated, hydraulic fluid, compressed air, or vacuum is introduced into the cylinder 55 in a direction to move the piston 56 forwardly in the cylinder 55, whereby the locking bar 48 is moved forwardly, releasing the main truck member 34, and at the same time rotating the hinge leaf 52 upwardly to lock the steering bar 27 with the steering link member 18. Under these conditions, the turning movement of the tractor 12 will tend to rotate the steering member 18 relative to the truck 13 and will communicate steering movement to the main truck member 34, causing the rear wheels 40 to be steered in a manner to shorten the turning radius of the trailer truck and to thus increase its maneuverability.

The cylinder 55 may be connected to any suitable fluid pressure source or source of compressed air or vacuum on the tractor, through suitable conduits, and through suitable valves mounted on the dashboard of the tractor, so that cylinder 55 is conveniently controlled by the driver of the trailer vehicle.

When the locking bar 48 is in its forwardly moved position, namely, when the main truck member 34 is released, the bar is held in said forwardly moved position by the fluid, compressed air or vacuum in the cylinder 55. The forward end of the bar 48 slidably engages the leaf member 52 so that said leaf member is freely movable with the steering bar 27 on which it is mounted.

As previously stated, the lower ends of the pivot studs 33 and 26 may be provided with any suitable means to retain the respective washers 37 and 28 thereon. Thus, the collar elements 38 and 29 may comprise respective horizontally flattened ends of a longitudinally extending beam member 60, serving to rigidly connect the lower ends of the pivot studs 33 and 26.

While a specific embodiment of an improved steering mechanism for a trailer-tractor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle comprising a tractor, a trailer, and a steering link member on the forward end of said trailer pivotally connected to the tractor, a truck member disposed beneath the rear portion of the trailer, means pivotally connecting said truck member to the bottom of the trailer, a plurality of road wheels journaled to said truck member, a transverse steering bar beneath the forward portion of the trailer, means pivotally connecting the intermediate portion of said steering bar to the underside of the trailer, respective link bars connecting the end portions of the steering bar to the respective opposite side portions of said truck member, a longitudinal locking bar slidably mounted on the trailer between said truck member and said steering bar, the rear end of said locking bar being at times lockingly interengageable with said truck member to lock the truck member with respect to the trailer, and means rigidly locking said steering bar to said steering link member responsive to the disengagement of said locking bar from said truck member.

2. A vehicle comprising a tractor, a trailer, a steering link member pivotally connected to the underside of the trailer at the forward end portion thereof, means pivotally connecting the forward end of said steering link member to the tractor, a truck member disposed beneath the rear portion of the trailer, means pivotally connecting said truck member to the bottom of the trailer, respective road wheels journaled to the opposite sides of said truck member, a transverse steering bar pivotally connected at its intermediate portion to the underside of the trailer on the same vertical axis as the pivotal connection of said steering link member, respective link bars connecting the end portions of the steering bar to the respective opposite side portions of said truck member, a longitudinal locking bar slidably mounted beneath the trailer between said truck member and said steering bar, means on the steering bar lockingly engageable with said steering link member responsive to forward movement of said locking bar, to at times rigidly secure said steering bar to said steering link member, whereby said truck member is controlled by said steering link member and rotates therewith, and means on said truck member lockingly engageable by said locking bar when the locking bar is moved rearwardly at other times, whereby said truck member is locked against rotation relative to the trailer at said other times.

3. A vehicle comprising a tractor, a trailer, a steering link member pivotally connected to the underside of the trailer at the forward end portion thereof, means pivotally connecting the forward end of said steering link member to the tractor, a truck member disposed beneath the rear portion of the trailer, means pivotally connecting said truck member to the bottom of the trailer, respective road wheels journaled to the opposite sides of said truck member, a transverse steering bar pivotally connected at its intermediate portion to the underside of the trailer on the same vertical axis as the pivotal connection of said steering link member, respective link bars connecting the end portions of the steering bar to the respective opposite side portions of said truck member, a longitudinal locking bar slidably mounted beneath said trailer between said truck member and said steering bar, means on the steering bar lockingly engageable with said steering link member responsive to forward movement of said locking bar, to at all times rigidly secure said steering bar to said steering link member, whereby said truck member is controlled by said steering link member and rotates therewith, means on said truck member lockingly engageable by said locking bar when the locking bar is moved rearwardly at other times, whereby said truck member is locked against rotation relative to the trailer at said other times, an operating cylinder mounted longitudinally on the trailer, a piston in said cylinder, and means rigidly connecting said piston to said locking bar, whereby the movement of said locking bar is controlled by said cylinder.

References Cited in the file of this patent

UNITED STATES PATENTS

| | | |
|---|---|---|
| 2,389,752 | Avery | Nov. 27, 1945 |
| 2,764,424 | Standing | Sept. 25, 1956 |

FOREIGN PATENTS

| | | |
|---|---|---|
| 74,521 | Denmark | July 21, 1952 |
| 651,473 | Great Britain | Apr. 4, 1951 |